United States Patent
McMurray et al.

(10) Patent No.: US 9,468,904 B2
(45) Date of Patent: Oct. 18, 2016

(54) SORBENT COMPOSITIONS HAVING PNEUMATIC CONVEYANCE CAPABILITIES

(71) Applicants: Sarah G. McMurray, Golden, CO (US); Jacqueline Cecil de Peyer, Bailey, CO (US); Robert B. Huston, Longmont, CO (US); Joseph M. Wong, Castle Rock, CO (US)

(72) Inventors: Sarah G. McMurray, Golden, CO (US); Jacqueline Cecil de Peyer, Bailey, CO (US); Robert B. Huston, Longmont, CO (US); Joseph M. Wong, Castle Rock, CO (US)

(73) Assignee: ADA Carbon Solutions, LLC, Littleton, CO (US)

( * ) Notice: Subject to any disclaimer, the term of this patent is extended or adjusted under 35 U.S.C. 154(b) by 269 days.

(21) Appl. No.: 14/145,731

(22) Filed: Dec. 31, 2013

(65) Prior Publication Data

US 2015/0182942 A1  Jul. 2, 2015

(51) Int. Cl.
*B01J 20/20* (2006.01)
*B01J 20/28* (2006.01)

(52) U.S. Cl.
CPC ................................ *B01J 20/28004* (2013.01)

(58) Field of Classification Search
CPC .......... B01J 20/00; B01J 20/02; B01J 20/10; B01J 20/103; B01J 20/12; B01J 20/20
See application file for complete search history.

(56) References Cited

U.S. PATENT DOCUMENTS

| | | | |
|---|---|---|---|
| 5,691,294 A | 11/1997 | France et al. | |
| 5,972,525 A | 10/1999 | Mori et al. | |
| 6,065,330 A | 5/2000 | Freeman et al. | |
| 6,117,810 A | 9/2000 | Lee et al. | |
| 6,129,846 A | 10/2000 | Gadkaree | |
| 6,719,828 B1 | 4/2004 | Lovell et al. | |
| 6,833,185 B2 | 12/2004 | Zhu et al. | |
| 6,848,374 B2 | 2/2005 | Srinivasachar et al. | |
| 7,858,061 B2 | 12/2010 | Varma et al. | |
| 8,080,088 B1 | 12/2011 | Srinivasachar | |
| 8,329,614 B2 | 12/2012 | Chao et al. | |
| 2003/0110986 A1 | 6/2003 | Reddy et al. | |
| 2009/0056538 A1 | 3/2009 | Srinivasachar et al. | |

(Continued)

FOREIGN PATENT DOCUMENTS

| | | |
|---|---|---|
| CA | 1267881 | 4/1990 |
| EP | 1773526 B1 | 2/2011 |

(Continued)

OTHER PUBLICATIONS

Sogaard et al., Development of a Reproducible Powder Characterization Method Using a Powder Rheometer, Annual transactions of the Nordic Rheology Society, 2012, pp. 239-245, vol. 20, Copenhagen, Denmark.
Freeman, New Insights into Powder Flowability, Innovations in Food Technology, pp. 1-5 (Dec. 2001).
Freeman Technology Information Pamphlet, Measuring the Flow Properties of Powders, pp. 1-6 (Date Unknown).
Freeman Technology Information Pamphlet, Measuring and Understanding the Flow Properties of Powders with FT4 Powder Rheometer, pp. 1-8 (Date Unkown).

*Primary Examiner* — Richard M Rump
(74) *Attorney, Agent, or Firm* — Marsh Fischmann & Breyfogle LLP

(57) ABSTRACT

A sorbent composition such as for the removal of a contaminant species from a fluid stream, a method for manufacturing a sorbent composition and a method for the treatment of a flue gas stream to remove heavy metals such as mercury (Hg) therefrom. The sorbent composition includes a porous carbonaceous sorbent such as powdered activated carbon (PAC) and a solid particulate additive that functions as a flow-aid to enhance the pneumatic conveyance properties of the sorbent composition. The solid particulate additive may be a flake-like material, for example a phyllosilicate mineral or graphite.

24 Claims, 10 Drawing Sheets

(56) References Cited

U.S. PATENT DOCUMENTS

| | | |
|---|---|---|
| 2010/0202946 A1 | 8/2010 | Yang et al. |
| 2013/0109562 A1 | 5/2013 | Wong et al. |
| 2013/0272941 A1 | 10/2013 | Leung |
| 2014/0186625 A1* | 7/2014 | Wong ................. B01J 20/20 428/402 |

FOREIGN PATENT DOCUMENTS

| | | |
|---|---|---|
| WO | 2006/099291 A2 | 9/2006 |
| WO | 2013/063490 A1 | 5/2013 |
| WO | 2013/082157 A1 | 6/2013 |
| WO | 2013/082856 A1 | 6/2013 |

* cited by examiner

SORBENT COMPOSITIONS HAVING PNEUMATIC CONVEYANCE CAPABILITIES

FIELD

This disclosure relates to the field of sorbent compositions, and in particular to carbonaceous sorbent compositions such as powdered activated carbon compositions that have improved pneumatic conveyance capabilities.

BACKGROUND

Powdered activated carbon ("PAC") is a highly amorphous form of carbon having an average particle size of about −80 mesh (e.g., not greater than about 177 µm). PAC may be manufactured to have a high porosity, a small average pore size and a high surface area, and as such is able to bind (e.g., adsorb) many contaminant species from another substance, thereby purifying (e.g., decontaminating) the other substance.

Industrial applications of PAC include, but are not limited to, the treatment of waste-water, food purification, and treatment of flue gas from a boiler (e.g., a coal boiler). In treatment of flue gas, PAC acts to remove contaminants such as mercury. For many such industrial applications, PAC is shipped in bulk to an end user, such as by using trucks, rail shipment, or the like. The PAC is unloaded from the truck or rail car and may be placed subsequently in a storage unit (e.g., a storage silo). When the PAC is needed, it is then conveyed to the point of use, e.g., to a water treatment process or to a flue gas treatment process.

Often, the PAC is pneumatically conveyed, such as from a rail car to a storage unit, from a rail car to a transportation truck, or from a transportation truck to a storage unit, and/or from the storage unit to the point of use. Pneumatic conveyance of PAC involves conveying the PAC through an enclosed pipeline using a pressure differential and the flow of a gas (e.g., air) to suspend and move the PAC along the pipeline. Typically, the PAC is conveyed in a dilute phase, i.e., where the conveying system relies on the gas velocity to pick up and entrain the particles. Pneumatic conveyance of PAC has many advantages over other conveyance techniques. For example, pneumatic conveyance pipelines can be arranged with bends to circumvent other equipment, and the system has few moving parts and is completely enclosed.

SUMMARY

Recently, it has been found that for some applications, and for the treatment of flue gas streams in particular, particulate sorbent compositions (e.g., PAC-containing sorbent compositions) having a reduced average particle size may be advantageous for the capture of contaminants such as mercury (Hg) from the flue gas stream. In particular, PAC compositions having a relatively small average particle size, such as a median particle size (D50) of about 15 µm or less, may be advantageous for the efficient removal of mercury from a flue gas stream.

However, it has been found that some PAC-containing sorbent compositions having a relatively small average particle size may be difficult to pneumatically convey in some situations, such as from a storage unit to the point of use (e.g., to the lances that inject the PAC-containing sorbent composition into the flue gas stream). Specifically, it has been found that such compositions may experience flow interruption issues during pneumatic conveyance, which can result in feeder and/or blower shut down for a period of time due to pressure spikes in the conveyance lines and/or other flow irregularities. Such shut downs may result in an interruption of the PAC flow to the flue gas stream and may lead to mercury emission problems. A need has been identified for a sorbent composition containing PAC having a relatively small median (D50) particle size and with good pneumatic conveyance properties, i.e., to reduce interruptions during pneumatic conveyance of the sorbent composition.

Disclosed herein are sorbent compositions that include a relatively small particle size PAC as a sorbent material, where the composition is formulated to enhance the pneumatic conveyance properties of the composition, particularly when pneumatically conveyed in a dilute phase, without any significant loss of adsorptive performance. In one embodiment, a sorbent composition is provided that includes a particulate blend of at least about 75 wt. % of a porous carbonaceous sorbent having a median particle size (D50) of at least about 4 µm and not greater than about 15 µm. The sorbent composition also includes at least about 0.1 wt. % and not greater than about 5 wt. % of a solid particulate additive, where the solid particulate additive has at least one particle property selected from: (i) a median aspect ratio of not greater than 0.7; (ii) a median circularity of not greater than 0.92; or (iii) a median elongation factor of at least 0.3.

In one characterization, the sorbent composition comprises powdered activated carbon, and may consist essentially of powdered activated carbon. In another characterization, solid particulate additive has a median aspect ratio of not greater than 0.7, such as not greater than 0.67. In another characterization, the solid particulate additive has a median circularity of not greater than 0.92, such as not greater than 0.90. In yet another characterization, the solid particulate additive has a median elongation factor of at least 0.3, such as at least 0.33.

In another characterization, the sorbent composition has a Basic Flow Energy (BFE) of not greater than about 330 mJ, as measured by a powder rheometer using the Stability and Variable Flow Rate test described in detail below. In another characterization, the sorbent composition has a BFE of not greater than about 265 mJ.

In another characterization, the sorbent composition has a Specific Energy (SE) of not greater than 7.5 mJ/g, as measured by a powder rheometer using the Stability and Variable Flow Rate test. In another characterization, the SE of the sorbent composition is not greater than 7 mJ/g.

The sorbent compositions may also be characterized as having an Aeration Energy (AE) of not greater than 30 mJ, during the aeration test, as measured by a powder rheometer, such as by having an AE of not greater than 24 mJ or even an AE of not greater than about 10 mJ.

In another characterization, porous carbonaceous sorbent has a median particle size of not greater than about 12 µm, such as from about 8 µm to about 12 µm. The median particle size of the solid particulate additive may be at least about 1 µm. For example, the solid particulate additive may be characterized as having a median particle size that is greater than or is equal to the median particle size of the porous carbonaceous sorbent. In another characterization, the solid particulate additive may have a median particle size that is less than the median particle size of the sorbent.

In one characterization, the solid particulate additive may be selected from the group consisting of phyllosilicate minerals, graphite, and mixtures thereof. In one particular characterization, the solid particulate additive may be selected from the group consisting of mica, talc, graphite, and mixtures thereof, and in another particular characterization the solid particulate additive is graphite. The sorbent composition may be characterized as comprising not greater than about 5 wt. % of the solid particulate additive, such as comprising not greater than about 3 wt. % of the solid particulate additive or even comprising not greater than about 2 wt. % of the solid particulate additive.

In another characterization, the addition of the solid particulate additive to the sorbent composition reduces fluctuation in line pressure during pneumatic conveyance as measured by standard deviation of less than ±0.050 psi. In another characterization, the solid particulate additive reduces fluctuation in line pressure of the sorbent composition during pneumatic conveyance as measured by a difference between maximum to minimum line pressure of less than 0.1 psi, such as a difference between maximum to minimum line pressure of less than 0.08 psi, or even less than 0.06 psi.

In another embodiment, a sorbent composition is provided that comprises a particulate blend of at least about 50 wt. % powdered activated carbon sorbent having a median particle size (D50) of at least about 5 μm and not greater than about 15 μm, and at least about 0.1 wt. % and not greater than about 2 wt. % of a solid particulate additive selected from the group consisting of phyllosilicate minerals, graphite and mixtures thereof.

In one characterization, the solid particulate additive is selected from the group consisting of mica, talc, graphite, and mixtures thereof, and in one particular characterization the solid particulate additive comprises graphite. The graphite may have a median particle size of at least about 3 μm and not greater than about 5 μm, for example.

According to another embodiment, a method for the treatment of a flue gas stream to remove heavy metals therefrom is provided. The method includes the steps of pneumatically conveying a sorbent composition from a storage unit to a point of injection; and injecting the sorbent composition into a flue gas stream. The sorbent composition comprises powered activated carbon and an effective amount of a solid particulate additive such that the sorbent composition has a Basic Flow Energy of not greater than about 350 mJ.

In one characterization, the sorbent composition has a Specific Energy of not greater than about 7.5 mJ/g. In another characterization, the sorbent composition has an Aeration Energy of not greater than about 35 mJ. In yet another characterization, the sorbent composition has a basic flow energy of not greater than about 300 mJ.

DESCRIPTION OF THE INVENTION

Disclosed herein are sorbent compositions, methods of making a sorbent compositions, and methods for using sorbent compositions. The sorbent compositions may include a porous carbonaceous material such as PAC as a sorbent material, and the sorbent compositions may be particularly formulated to remove contaminants from a fluid stream, such as to remove heavy metals, e.g., mercury (Hg), from a flue gas emanating from a boiler (e.g., from a pulverized coal boiler or a waste incinerator). In addition to PAC, the sorbent compositions may include a solid particulate additive that is selected to decrease the energy required to pneumatically convey the sorbent composition, e.g., from a storage unit to the point of injection. Although the sorbent compositions disclosed herein are described with particular reference to flue gas treatment, the sorbent compositions may be used in other applications, including but not limited to waste water treatment and other industrial purification processes.

When a combustible material containing fixed carbon and volatile matter (e.g., coal or municipal waste) is combusted in a boiler (e.g., for the generation of electricity using a steam turbine), a flue gas is formed that includes contaminants that originate from the combustible material. Such contaminants may include mercury, e.g., in concentrations of from about 1 ppbw to 100 ppbw (parts per billion by weight). Environmental regulations limit the concentration of mercury in the flue gas that can be vented to the atmosphere. One method to capture mercury from the flue gas is to contact the flue gas with a sorbent such as PAC, e.g., by injecting PAC into the flue gas stream. PAC is known to effectively remove heavy metals such as mercury from such fluid streams.

Figure 1:
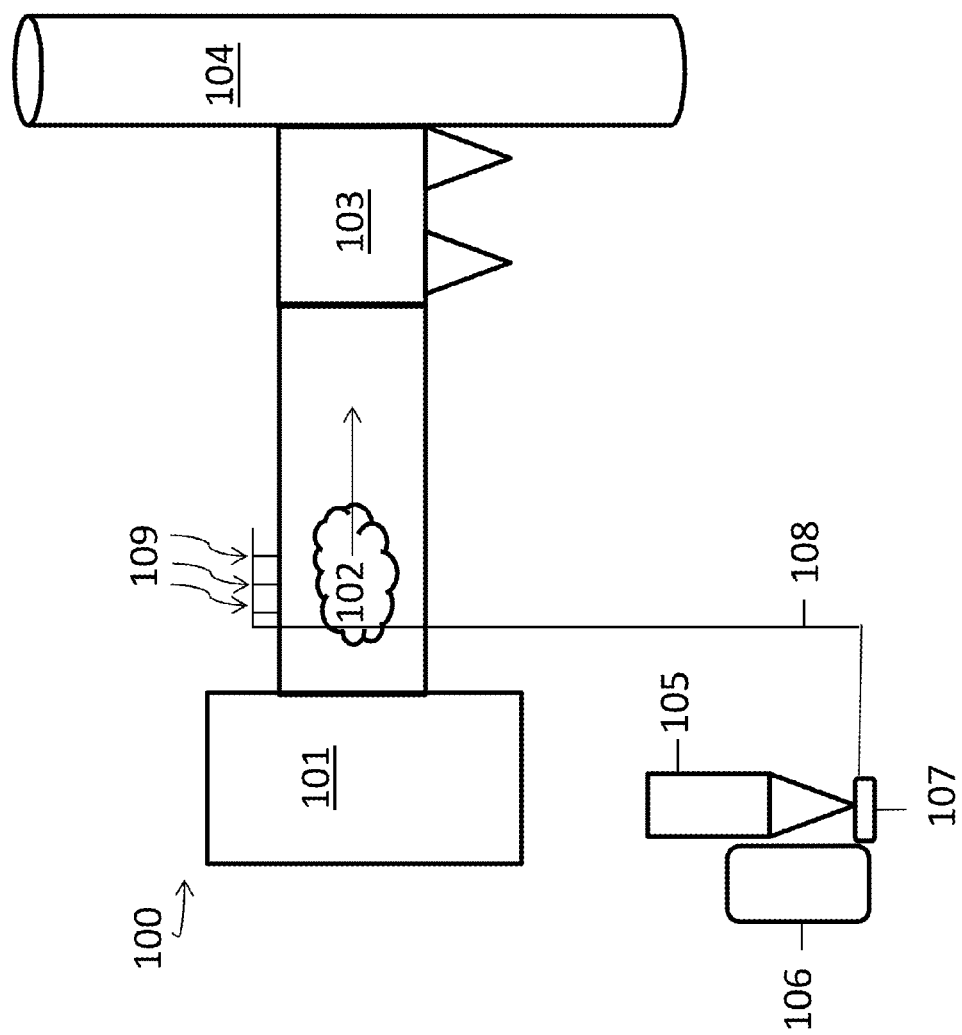
FIG. 1 is a schematic illustration of a system and method for pneumatically transporting and introducing a sorbent composition into a flue gas stream at an electric generating unit (EGU) or industrial boiler site.

FIG. 1 schematically illustrates a system 100 and method for pneumatically transporting and introducing a particulate sorbent composition into a flue gas stream 102 at a power plant or industrial boiler site, such as a coal-burning facility. A boiler 101 is configured to burn coal and/or another material (e.g., municipal waste). The burning of coal in the boiler 101 creates a flue gas stream 102 that may include various components including gases (e.g., $N_2$, $CO_2$, $O_2$, $NO_x$, $SO_x$ etc.) and particulates (e.g., fly ash). The flue gas typically also includes heavy metals such as Hg that must be removed from the flue gas stream 102 before exiting the stack 104. In this regard, sorbent compositions such as PAC may be injected into the flue gas stream 102 to capture (e.g., sequester) mercury.

PAC may be stored in a silo or hopper 105 prior to introduction to the flue gas stream 102. A blower 106 forces air through an eductor 107 creating a venturi effect dispersing the PAC into a conveyance line 108 and through injection lances 109 into the flue gas stream 102. Further, a screw feeder (not shown) may transport PAC from the silo or hopper 105 to the eductor 107. After contacting the flue gas stream 102 with the PAC, the flue gas stream may be introduced to a particulate matter separation unit 103 to remove particulates (e.g., PAC and fly ash) before exiting the stack 104. This particulate matter separation unit 103 may be, for example, an electrostatic precipitator. It will be appreciated by those skilled in the art that the plant may include other devices not illustrated in FIG. 1, such as a selective catalytic reduction unit (SCR), an air preheater, and the like, and may have numerous other configurations.

PAC having a median particle size of about 30 μm or greater generally performs well in such a system, i.e., the PAC does not typically present pneumatic conveyance problems when being pneumatically conveyed through conveyance line 108. However, use of smaller median particle size PAC, which may provide enhanced mercury capture performance from flue gas streams, may also result in interruptions in delivery of the PAC to the flue gas stream (e.g., due to plugging).

To address these issues, the sorbent composition disclosed herein may include a particulate blend of at least two components; a porous carbonaceous sorbent such as PAC and a solid particulate additive that is selected to improve the ability to pneumatically convey the sorbent composition. Although described herein with particular reference to PAC, it is to be understood that the sorbent may include other porous carbonaceous materials, i.e., porous sorbents that include a substantial amount of fixed carbon, such as reactivated carbon or carbonaceous char.

To enhance the efficacy of the flue gas treatment to remove heavy metals, the PAC may be characterized as having a relatively small average particle size, e.g., a relatively small volume average median particle size (D50). In this regard, the PAC may have a median particle size of not greater than about 20 μm, such as not greater than about 15 μm, or even not greater than about 12 μm. However, for material handling purposes, the PAC particles should not be too small, and in another characterization the PAC may have a median particle size of at least about 2 μm, such as at least about 4 μm, such as at least about 6 μm, or even at least about 8 μm. One exemplary median particle size range may be from about 4 μm to about 15 μm, which may be further exemplified by a median particle size range of from about 8 μm to about 12 μm. A relatively small median particle size, such as not greater than about 15 μm, typically means greater surface area per volume of the PAC. The increased surface area (e.g., as compared to PACs with a larger median particle size) may provide many benefits, including, but not limited to, increased surface area available for reactions to occur, and thus overall improved diffusion and reaction kinetics and mercury capture performance. The median particle size may be measured using techniques such as light scattering (e.g., using a Saturn DigiSizer II, available from Micromeritics Instrument Corporation, Norcross, Ga.).

In addition to the relatively small median particle size, the PAC may also have a relatively high pore volume and a well-controlled size distribution of the pores, particularly among the mesopores (i.e., from 20 Å to 500 Å diameter) and the micropores (i.e., not greater than 20 Å diameter). A well-controlled distribution of micropores and mesopores in the PAC is desirable for effective removal of contaminants from a fluid stream, such as for mercury removal from a flue gas stream. In one characterization, the sum of micropore volume plus mesopore volume of the PAC may be at least about 0.10 cc/g, such as at least 0.20 cc/g, and at least about 0.25 cc/g or even at least about 0.30 cc/g. In another characterization, the micropore volume of the PAC may be at least about 0.10 cc/g, such as at least about 0.15 cc/g. Further, the mesopore volume of the PAC may be at least about 0.10 cc/g, such as at least about 0.15 cc/g. In a further characterization, the ratio of micropore volume to mesopore volume may be at least about 0.7, such as 0.9, and may be not greater than about 1.5. Such levels of micropore volume relative to mesopore volume advantageously enable efficient capture and sequestration of oxidized mercury species, such as $HgBr_2$, by the PAC. Pore volumes may be measured by gas adsorption techniques (e.g., $N_2$ adsorption) using instruments such as a TriStar II Surface Area Analyzer (Micromeritics Instruments Corporation, Norcross, Ga., USA).

The PAC may also be characterized as having a well-controlled particle density. Particle density is the mass of the particle over the volume of the particle (excluding pore volume of larger pores that do not contribute to adsorption), and is typically measured in g/cc. Particle density correlates to the surface area to volume ratio of the PAC, which in turn affects mercury capture performance. Particle density can be measured by liquid mercury volume displacement, in which case the result is referred to as the mercury particle density. In this regard, the PAC may have a mercury particle density of at least about 0.5 g/cc, such as at least about 0.6 g/cc. Conversely, the mercury particle density of the PAC may be not greater than about 0.9 g/cc, such as not greater than about 0.8 g/cc. Mercury particle density may be measured using a Micromeritics AccuPyc Pycnometer (Micromeritics Inc., Norcross, Ga., USA).

Particle density may also be measured by sedimentary volume displacement, in which case the result is referred to as the envelope particle density. In this regard, the envelope particle density of the PAC may be at least about 0.5 g/cc, such as at least about 0.6 g/cc or at least about 0.7 g/cc. The envelope particle density of the PAC may be not greater than about 1.0 g/cc, such as not greater than about 0.9 g/cc. Envelope particle density may be measured using a Micromeritics GeoPyc Envelope Density Analyzer (Micromeritics, Inc., Norcross, Ga., USA).

The foregoing description of the PAC pore characteristics and density characteristics are being presented as exemplary embodiments, and it will be appreciated that the present disclosure is not limited to the use of PAC or other carbonaceous sorbents having these specific characteristics.

As is discussed above, PACs having a small median particle size (e.g., not greater than about 15 μm) may be difficult to pneumatically convey in some situations. Flow interruptions and irregularities may lead to feeder and blower shut down in the sorbent conveyance system, such as due to pressure spikes. Such interruptions may be due to cohesiveness of the powder, mechanical interlocking of the particles, static charge buildup, or other factors. Such instabilities and interruptions can be particularly problematic when the PAC is being conveyed from a storage unit to the injection lances that inject the PAC into the flue gas stream, as flow interruptions can cause the flue gas to pass through the stack without contacting a sufficient amount of PAC to remove mercury from the flue gas. In this regard, the sorbent compositions disclosed herein may also include a solid particulate additive, e.g., that is blended with (e.g., dispersed throughout) the PAC, where the solid particulate additive is selected to enhance the ability to pneumatically convey the sorbent composition, e.g., to reduce the possibility of flow interruptions.

Silica has been used as a flow additive, particularly at small median particle sizes, e.g., much less than 1 μm, to improve the flow properties of some powders. These fine-sized silica particles tend to agglomerate to form larger and generally spherical (e.g., non-flake-like) agglomerates. However, it is has been found that the ability to pneumatically convey a sorbent composition containing PAC may be enhanced when the solid additive particles are non-spherical (e.g., anisometric) in shape, and in particular when the solid additive particles are predominately flake-like.

In one aspect, the solid particulate additive may be selected from those materials that form such sheet or flake-like morphologies naturally due to their inherent structure, e.g., their inherent morphology. The solid particulate additive may be predominately crystalline (e.g., greater than 50% crystalline), as non-crystalline (i.e., amorphous) materials do not form such flake-like morphologies naturally. The solid particulate additive may also be characterized as having well defined cleavage planes. Examples of such materials include phyllosilicates (i.e., sheet silicates). Phyllosilicates are a group of minerals that includes the micas, chlorite, serpentine, talc, and the clay minerals. Among these, clay minerals (e.g., calcined clay minerals), aluminosilicates (e.g., calcined aluminosilicates), mica group minerals and talc (hydrated magnesium silicate) may be particularly useful as the solid particulate additive to enhance the pneumatic flow properties of the sorbent composition. Another example of a solid particulate additive is graphite. Among these, mica, talc and graphite may be particularly useful. Graphite also has an advantage in that it has favorable electrical properties that may make the sorbent composition easier to remove from the flue gas using particulate control devices such as an ESP. In one particular embodiment, the solid additive particles include natural graphite, e.g., natural flake graphite. The natural graphite may optionally be beneficiated (e.g., milled) to achieve a desired median particle size.

The sorbent compositions disclosed herein may include various amounts of the porous carbonaceous sorbent (e.g., PAC) and the solid particulate additive, provided that there is a sufficient amount of the PAC to effectively remove contaminants from a fluid stream (e.g., to remove mercury from a flue gas stream) and a sufficient amount of the solid particulate additive to enhance the pneumatic flow properties of the PAC. In one embodiment, the sorbent composition includes at least about 50 wt. % of the porous carbonaceous sorbent, such as at least about 60 wt. %, at least about 75 wt. %, at least about 80 wt. % or even at least about 85 wt. %. However, the sorbent compositions will typically include not greater than about 99 wt. % of the porous carbonaceous sorbent, such as not greater than about 98 wt. %.

It is an advantage that the pneumatic conveyance properties of the sorbent composition can be improved even with the addition of a relatively small amount of the solid particulate additive. Because relatively small amounts of the solid particulate additive are required, the ability of the sorbent composition to remove (e.g., adsorb) contaminant species from a fluid stream is not substantially diminished by the presence of the additive. In this regard, the sorbent composition may include not greater than about 5 wt. % of the solid particulate additive, such a not greater than about 3 wt. %, or even not greater than about 2 wt. %. However, it may be necessary to include at least about 0.1 wt. %, such as at least about 0.5 wt. %, of the solid particulate additive in the sorbent composition to provide a sufficient improvement in the pneumatic conveyance properties.

Scanning electron microscopy (SEM) may be used to characterize the shape of the particulate additives. A particle's shape can also be quantified using various shape factors, which are dimensionless quantities used in image analysis and microscopy. The dimensionless quantities often represent the degree of deviation from an ideal shape, such as a circle, sphere, or equilateral polyhedron. Shape factors are often normalized, that is, the value ranges from zero to one. A shape factor equal to one usually represents an ideal case or maximum symmetry, such as a circle, sphere, square or cube. Shape factors may be calculated from measured dimensions, such as diameter, chord length, area, perimeter, centroid, moments, and the like. The dimensions of the particles are usually measured from two-dimensional cross-sections or projections, as in a microscope field, but shape factors also apply to three-dimensional objects. Shape factors are independent of the particle size.

A few shape factors that may be pertinent in distinguishing non-flake-like particles (e.g., spherical-like) such as silica from the flake-like particulate additives (e.g., phyllosilicates and graphite) disclosed herein are aspect ratio, elongation, and circularity. These shape factors may be determined based on particle length, area, width and perimeter measurements obtained using automated imaging instrumentation (e.g., the Malvern MorphologiG3, Malvern Instruments Limited, Worcestershire, UK). Such instruments may be utilized to first determine the major axis and minor axis of the particles. The major axis passes through the center of mass of the imaged object at an orientation corresponding to the minimum rotational energy of the shape. The minor axis passes through the center of mass at a right angle to the major axis. Length is the longest line between two points on the perimeter that is also parallel to the major axis. Width is the longest line between two points on the perimeter that is also parallel to the minor axis. The perimeter is the total length of the object boundary calculated by summing the length of the boundary pixels. This includes an adjustment to take account of direction changes. The area is the visual projected area of the particle. It should be noted, however, due to the technical challenges of trying to determine three-dimensional shape characteristics from a two dimensional image, and due to the fact that sheet or flake-like objects will tend to lie in a manner difficult to determine its depth, no single factor is dispositive and it is best to consider all of the relevant factors in totality.

Aspect ratio is the ratio of the width to the length of the particle calculated as:

$$\text{Aspect Ratio} = \frac{\text{width}}{\text{length}}$$

Particles (or particle agglomerates) that have a spherical shape (i.e., lengths are similar to widths) will tend to have aspect ratios closer to one because the aspect ratio of a sphere (e.g., the two-dimensional rendition of a sphere) is one. Also, analysis of a large distribution of generally spherical-like particles will tend to give aspect ratios close to one because the random orientations will tend to average out. In comparison, phyllosilicates and graphite (e.g., flake-like particles) with organized structures tend to demonstrate an aspect ratio of less than one. As such, the median aspect ratio of the solid particulate additive disclosed herein may be not greater than about 0.7, such as not greater than about 0.68, such as not greater than about 0.66, such as not greater than about 0.63.

The elongation is yet another way to describe particle shape. Elongation is calculated as 1 minus the aspect ratio:

$$\text{Elongation} = 1 - \frac{\text{width}}{\text{length}}$$

A particle with a greater difference between its width and length will tend to have an elongation factor further from zero. As such, the median elongation of the solid particulate additive may be at least about 0.30, such as at least about 0.33, or even at least about 0.35, such as at least about 0.37.

Circularity is measured by the ratio of the area of the particle divided by the area of a circle that has the same perimeter as the particle. It can be calculated as:

$$\text{Circularity} = \frac{2\sqrt{\Pi \times \text{Area}}}{\text{Perimeter}}$$

Particles that have a spherical shape will tend to have circularity closer to one. Also, an analysis of a large distribution of amorphous particles will also tend to give a circularity close to one because the random orientations will tend to average out. In comparison, phyllosilicates and graphite (e.g., flake-particles) with organized structures tend to demonstrate a circularity of less than or further from one. Thus, the median circularity of the solid particulate additive disclosed herein may be not greater than about 0.92, such as not greater than about 0.90, not greater than about 0.88, not greater than about 0.86, or even not greater than about 0.84.

Thus, the solid particulate additives disclosed herein may be characterized as having any one of the foregoing shape factors, or any combination of two or three of the foregoing shape factors. Thus, in one embodiment, the solid particulate additive may be characterized as having at least one particle property (e.g., shape factor) selected from a median aspect ratio of not greater than 0.7, a median circularity of not greater than 0.92, and a median elongation factor of at least 0.3.

It is also advantageous that the pneumatic conveyance properties of the sorbent composition may be improved with even small amounts of the solid particulate additive in the sorbent composition. In this regard, the solid particulate additive can have little or no effect on the ability of the sorbent composition (e.g., the PAC) to capture mercury from a flue gas stream. In one aspect, the sorbent composition may comprise not greater than about 2.0 wt. % of the solid particulate additive, such as not greater than about 1.5 wt. % or even not greater than about 1.0 wt. %. In another aspect, the sorbent composition may comprise as little as at least about 0.1 wt. % of the solid particulate additive, such as at least about 0.25 wt. %, or at least about 0.5 wt. %.

The difference between median particle size of the solid particulate additive and the median particle size of the sorbent is not believed to be of significant consequence to enhancing the pneumatic conveyance characteristics of the sorbent composition. In one characterization, the median particle size of the solid particulate additive is smaller than the median particle size of the PAC. For example, in one characterization, the solid particulate additive may have a median particle size that is smaller than the median particle size of the PAC, such as where the particulate additive includes graphite having a median particle size of from about 3 μm to about 5 μm. In another characterization, the median particle size of the solid particulate additive, for example talc, is from about 12 μm to about 27 μm, and may be equal to or greater than the median particle size of the PAC. In another characterization, the solid particulate additive includes mica having a median particle size of from about 10 μm to about 17 μm, where the median particle size is about the same or slightly less than or more than the median particle size of the PAC.

In addition to the PAC and the solid particulate additive, the sorbent compositions may include other additives that are known to those skilled in the art, particularly those used to enhance the sequestration of mercury from a flue gas stream. For example, the sorbent compositions may also include an oxidizing agent that is adapted to oxidize the elemental mercury in the flue gas stream to an oxidized mercury species (e.g., $Hg^{2+}$) that may be captured and sequestered by the PAC. The oxidizing agent may be a halogen oxidizing agent, for example. In this regard, the oxidizing agent may include a halogen that is selected from the group consisting of fluorine, chlorine, bromine, iodine or a combination thereof. For example, the halogen oxidizing agent may be present in the sorbent composition as a halogen salt, such as a bromide salt (e.g., sodium bromide) or other bromine compound or moiety. Bromine may react with the elemental mercury to form an oxidized species such as $HgBr_2$. For example, the sorbent composition may include at least about one weight percent, such as at least 2 weight percent of a halogen oxidizing agent.

Other additives to the sorbent composition may include those additives that are selected to increase the tolerance of the sorbent composition to use in flue gas streams containing acid gases (e.g., containing $H_2SO_4$) and/or acid-gas precursors (e.g., $SO_x$). Such acid gas additives may include a metal cation selected from the group consisting of Group 3 to Group 14 metals. In one characterization, the metal cation is selected from the Group 13 and Group 14 metals. For example, the metal cation may be a Group 13 metal, and in a particular characterization may be aluminum. In another particular characterization, the metal cation may be tin. The salt may be an inorganic salt, and may include an anion selected from the group consisting of hydroxides, oxides, and carbonates. In one particular characterization, the salt may comprise aluminum hydroxide ($Al(OH)_3$). In another characterization, the salt may be selected from the group consisting of tin oxide ($SnO_2$) and tin hydroxide ($Sn(IV)(OH)_4$) the salt may have an anion or polyatomic anion that comprises an atom having a valency of 3 or higher, such as a valency of +3 or +4. The anion may comprise a metal. For example, the metal may be selected from the group consisting of Group 3 to Group 14 metals. In one characterization, the metal may be selected from the group consisting of Group 3 to Group 12 metals, or may be selected from the group consisting of Group 13 and Group 14 metals. For example, the metal may be a Group 13 metal, and in a particular characterization may be aluminum. In another particular characterization, the metal may be tin. In one particular characterization, the salt may comprise sodium aluminate (e.g., $NaAlO_2$ or $Na_2O.Al_2O_3$), including hydrated sodium aluminate (e.g., $NaAl(OH)_4$). In another characterization, the salt may comprise sodium stannate ($Na_2Sn(OH)_6$) calcium oxide (CaO), quicklime, also known as hydrated lime, used in flue gas to control $SO_3$, and neutralize acid gases.

As is noted above, the sorbent compositions disclosed herein (e.g., including a solid particulate additive) may advantageously have improved pneumatic conveyance properties as compared to known sorbent compositions, particularly when the sorbent (e.g., the PAC) has a relatively small median particle size (e.g., 15 μm or less). Among the bulk powder characteristics that can be quantitatively measured to indicate such an improvement are the Basic Flow Energy ("BFE"), the Specific Energy ("SE"), and the Aeration Energy ("AE") of the sorbent composition.

These bulk powder characteristics can be measured using a rheometer, for example using a Freeman Technology 4 ("FT4") Powder Rheometer, available from Freeman Technology (Worcestershire, United Kingdom). The FT4 Powder Rheometer is capable of quantitatively measuring the flowability characteristics of sorbent compositions, and these measurements can be utilized to predict the characteristics of the sorbent composition when being pneumatically conveyed, e.g., in a dilute phase. The FT4 Powder Rheometer includes a container for holding a powder sample and a rotor having a plurality of blades that is configured to move in the axial direction (e.g., vertically) through the powder sample while rotating relative to the container. See, for example, U.S. Pat. No. 6,065,330 by Freeman et al., which is incorporated herein by reference in its entirety.

BFE and SE may be determined using a FT4 Powder Rheometer via the common Stability and Variable Flow Rate method ("the SVFR method"). The SVFR method includes seven test cycles using a stability method and four test cycles using a variable flow rate method, where each test cycle includes a conditioning step before the measurement is taken. The conditioning step homogenizes the sorbent composition by creating a uniform low stress packing throughout the sample, which removes any stress history or excess entrained air prior to the measurement. The stability method includes maintaining the blade tip speed at about 100 millimeters per second (mm/s) during the measurement, whereas the variable flow rate method involves four measurements using different blade tip speeds, namely about 100 mm/s, about 70 mm/s, about 40 mm/s and about 10 mm/s. The test measures the energy required to rotate the blade through the powder from the top of the vessel to the bottom and to rotate the blade through the powder from the bottom to the top of the vessel.

The BFE is a measurement of the energy required to displace a precise volume of (conditioned) powder at a given flow pattern, flow rate, and blade tip speed. Stated another way, the BFE may be considered a measurement of the "flowability" of the sorbent composition. For many types of dry powders, including dry powders that incorporate a particulate additive such as a flow aid, the lower the BFE, the more easily the sorbent composition can be made to flow. BFE is the total energy required to create a defined flow pattern, measured during the seventh cycle during the stability method measurements of the SVR method described above, at a tip speed set at −100 mm/s, while the blade is rotating from the top of the vessel to the bottom.

Thus, it has been found that the sorbent compositions disclosed herein have improved pneumatic conveyance properties, such as when compared to the same or similar compositions that do not incorporate the particulate additive. One way that the present sorbent compositions may be characterized is that the sorbent compositions may have a BFE of not greater than about 350 millijoules (mJ), such as not greater than about 330 mJ, not greater than about 300 mJ, not greater than about 275 mJ, or even not greater than about 265 mJ.

The SE is the energy required to establish a particular flow pattern in a conditioned, precise volume of powder in an unconfined stress environment. In contrast to the BFE, the flow pattern is generated by an upward, clockwise motion of the blade in the rheometer, generating gentle lifting and low stress flow of the powder. SE is the total energy measured during the seventh cycle during the stability method measurements of the SVR method described above, at a tip speed set at −100 mm/s, while the blade is rotating from the bottom of the vessel to the top. As with the BFE, for many types of dry powders, including dry powders that incorporate a particulate additive such as a flow aid, the lower the SE, the more easily the sorbent composition can be made to flow. Thus, a lower SE may indicate better flowability, particularly in low stress environments. In this regard, the sorbent compositions disclosed herein may have a SE of not greater than about 7.5 millijoules per gram (mJ/g), such as not greater than about 7 mJ/g.

AE is how much energy is required for a powder to become aerated, which is directly related to the cohesive strength of the powder (i.e., the tendency for particles to stick together). It may be determined in the FT4 Powder Rheometer using the aeration test, which provides a series of precise air velocities to the base of the vessel containing the powder, and measures the reduction in flow energy at each velocity. During the aeration test, the air velocity (e.g., in mm/s) is varied over a range of about 0.2 mm/s to about 2.0 mm/s, in 0.2 mm/s increments. AE is the flow energy at 2.0 mm/s.

Thus, a lower AE generally indicates that a powder may be more easily pneumatically conveyed. In this regard, the sorbent compositions disclosed herein may have an AE of not greater than about 35 mJ, such as not greater than about 30 mJ, not greater than about 24 mJ, or even not greater than about 10 mJ.

In one example, the compositions may be characterized as having a reduced fluctuation in line pressure during pneumatic conveyance of the compositions as compared to the same or similar composition without the addition of a solid particulate additive disclosed herein. The fluctuation in line pressure may be described in terms of the standard deviation of the line pressure during pneumatic conveyance. In one characterization, the standard deviation in line pressure when using the sorbent compositions disclosed herein is not greater than about 0.050 pounds per square inch (psi), such as not greater than about 0.045 psi. Characterized another way, the standard deviation in line pressure is reduced by at least about 25%, such as by at least about 35%, as compared to the same or similar sorbent composition without the addition of a solid particulate additive described herein.

In another example, the fluctuation or instability in line pressure may be described in terms of the difference (delta) between the minimum and maximum line pressure during pneumatic conveyance of the composition. In one characterization, the difference between the minimum and maximum line pressure using the sorbent compositions disclosed herein is not greater than about 0.1 psi, such as not greater than about 0.08 psi, or even not greater than about 0.06 psi.

EXAMPLES

Samples of sorbent compositions are prepared to evaluate the pneumatic transport capability of the sorbent compositions disclosed herein as compared to known sorbents. Comparative Sample 1 is a prior art sorbent composition that includes PAC and has a median particle size of about 30 μm and performs well at EGU sites with respect to pneumatic conveyance. Comparative Sample 2, is a prior art sorbent composition that includes PAC and has a median particle size below 15 μm and shows improved mercury capture capability. However, due to the small particle size, the sorbent may be susceptible to pneumatic conveyance interruptions. Sample 3 is a sorbent composition made by the addition of 1.0 wt. % graphite to comparative Sample 2 in bulk volume. Comparative Sample 4 is a comparative sorbent composition that includes PAC and has a median particle size of about 30 μm and performs well at EGU sites with respect to pneumatic conveyance. Sample 5 is a sorbent composition according to the present disclosure wherein 0.5 wt. % graphite is mixed with comparative Sample 2 at lab scale. Sample 6 is also an example sorbent composition according to the present disclosure wherein 1.0 wt. % graphite is mixed with comparative Sample 2 at lab scale.

Sample 7 is also a sorbent composition according to the present disclosure wherein 0.5 wt. % mica is mixed with comparative Sample 2 at lab scale. Sample 8 is a sorbent composition according to the present disclosure, wherein 0.5 wt. % talc is mixed with comparative Sample 2 at lab scale.

Example 1

Example 1 illustrates the ability of a sample of the sorbent compositions disclosed herein to exhibit improved flow properties in pneumatic conveyance systems as compared to comparative Sample 1, such as at an EGU or industrial boiler site. A demonstration system is built to simulate the pneumatic conveyance of the sorbent composition in an industrial system such as that illustrated in part in FIG. 1, i.e., from the hopper 105 through the conveyance line 108. Specifically, the demonstration system includes a first receiving hopper that receives sorbent composition from a bulk bag containing at least 750 lbs. of product. A blower and an eductor are used to convey the sorbent composition into a flexible hose. The hose, at about 400' in length, transports the sorbent composition to a trailer. The pressure (psi) is measured approximately 3' after the eductor. The 400' hose is laid out to include seven hard bends and four soft bends. Hard bends are defined as those making a 90 degree turn or less. Soft bends are defined as those making greater than a 90 degree turn. Tests are run by injecting a sample at a specified loading rate (e.g., 300, 500 and 700 pounds per hour (PPH), and line pressure (psi) is measured once a minute for 30 minutes.

Figure 2:
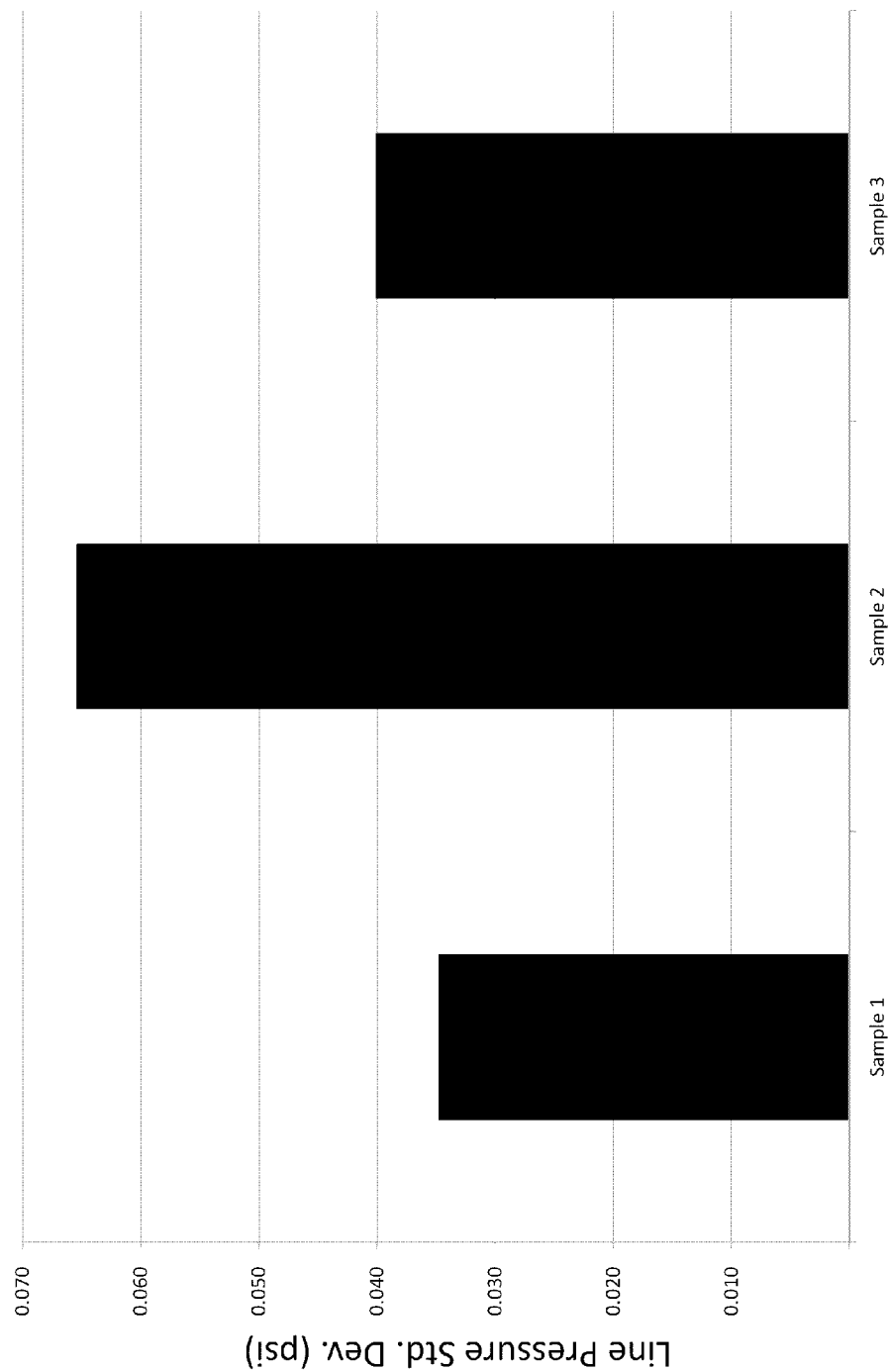
FIG. 2 illustrates the standard deviation of pressure readings during pneumatic transportation of sorbent compositions in a pilot plant system.

FIG. 2 illustrates the standard deviation of line pressure (psi) for each of comparative Samples 1 and 2, with Sample 3. The standard deviation of Sample 3 which included 1.0 wt. % graphite additive more closely matches that of the comparative Sample 1, a sorbent material of larger median particle size with no known pneumatic conveyance issues. Comparative Sample 2, with essentially the same particle size PAC as Sample 3, exhibits a much higher standard deviation in line pressure.

Figure 3:
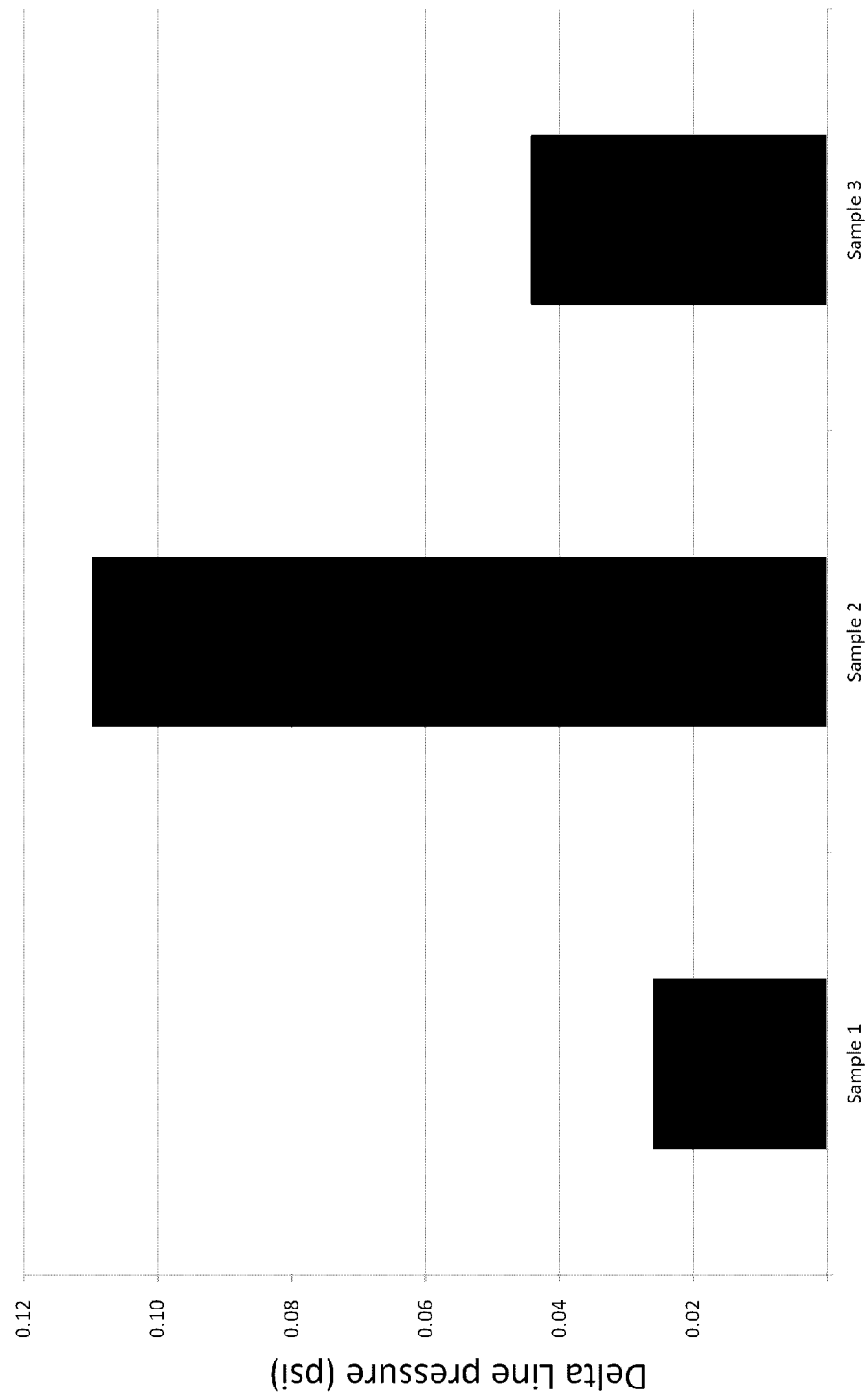
FIG. 3 illustrates difference between the maximum pressure reading to the minimum pressure reading during pneumatic transportation of sorbent compositions in a pilot plant system.

FIG. 3 illustrates the difference (delta) between maximum and minimum line pressures in pounds per square inch (psi) for each of comparative Samples 1 and 2, with Sample 3. The difference of maximum to minimum line pressures of Sample 3 more closely matched that of the comparative Sample 1 a sorbent material of larger median particle size with no known pneumatic conveyance issues. The comparative Sample 2, with essentially the same particle size PAC as Sample 3, exhibits a much higher difference in line pressure than Sample 3.

Example 2

Figure 4A:
FIGS. 4A and 4B illustrate scanning electron microscope (SEM) images of graphite.
Figure 4B:
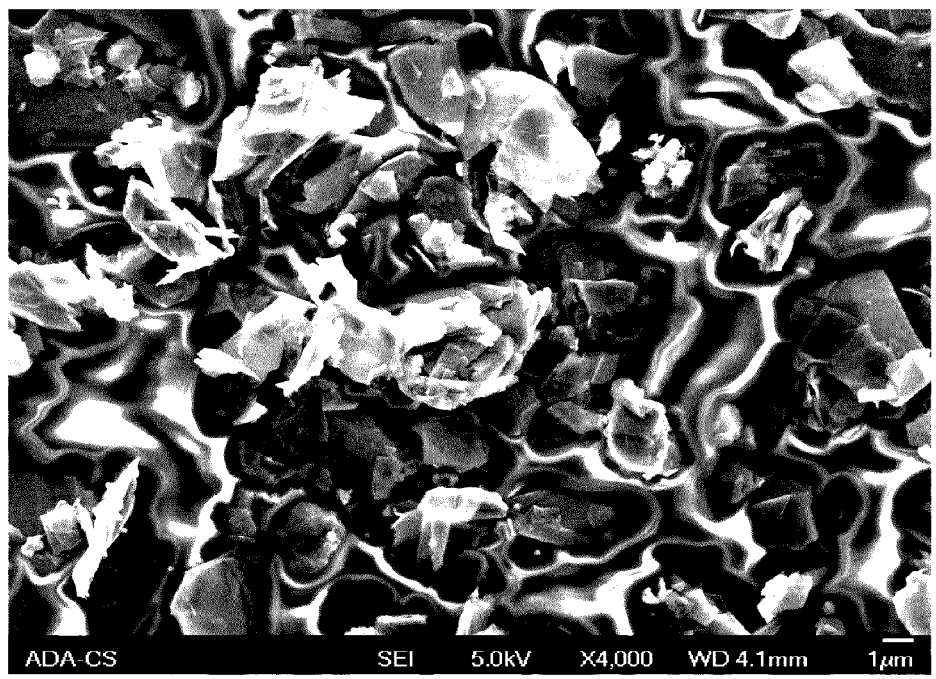
Figure 5A:
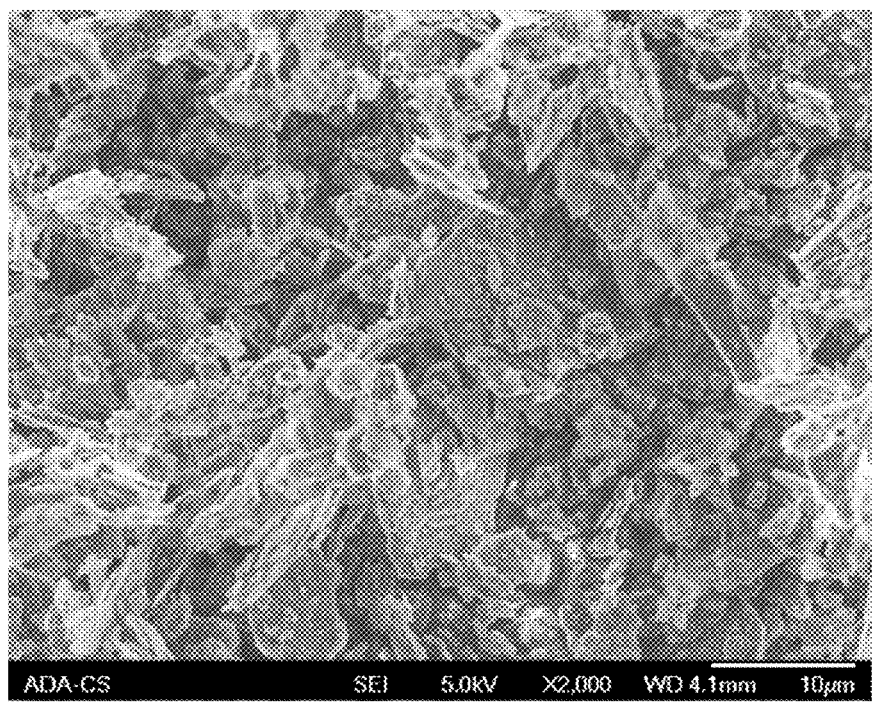
FIGS. 5A and 5B illustrate SEM images of mica.
Figure 5B:
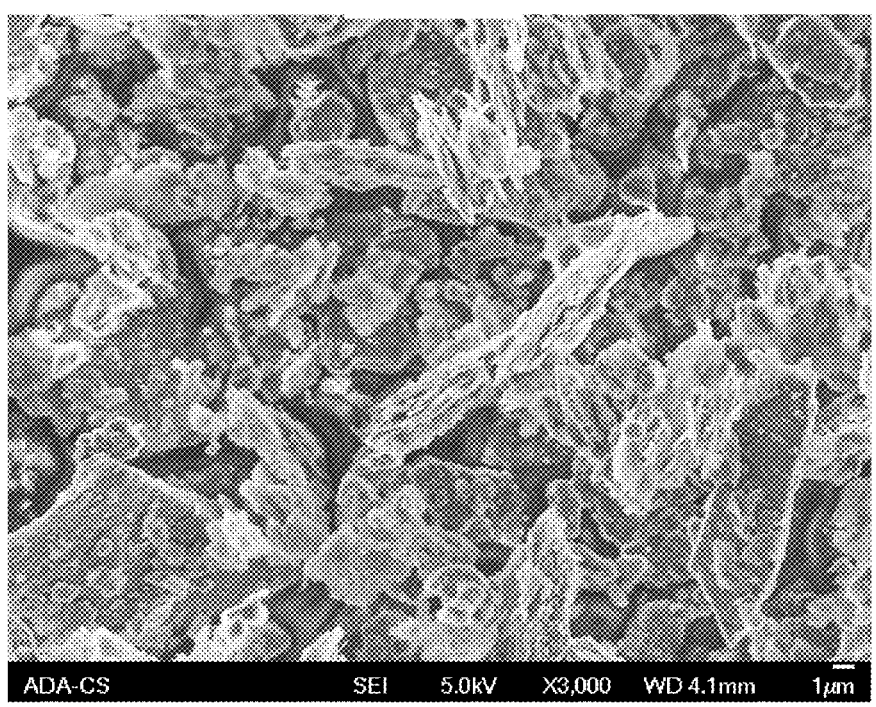
Figure 6A:
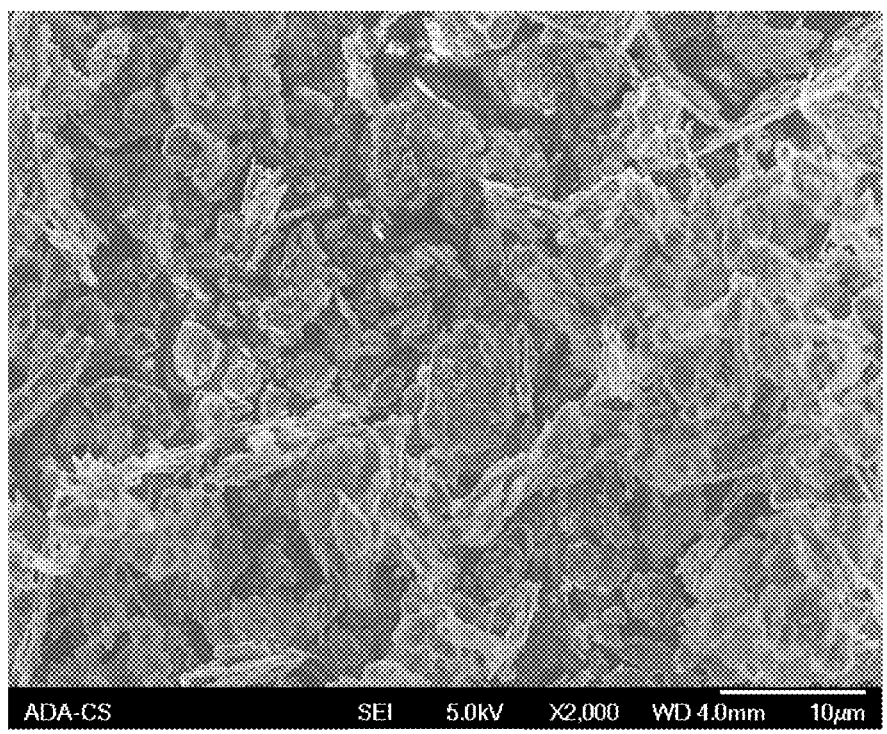
FIGS. 6A and 6B illustrate SEM images of talc.
Figure 6B:
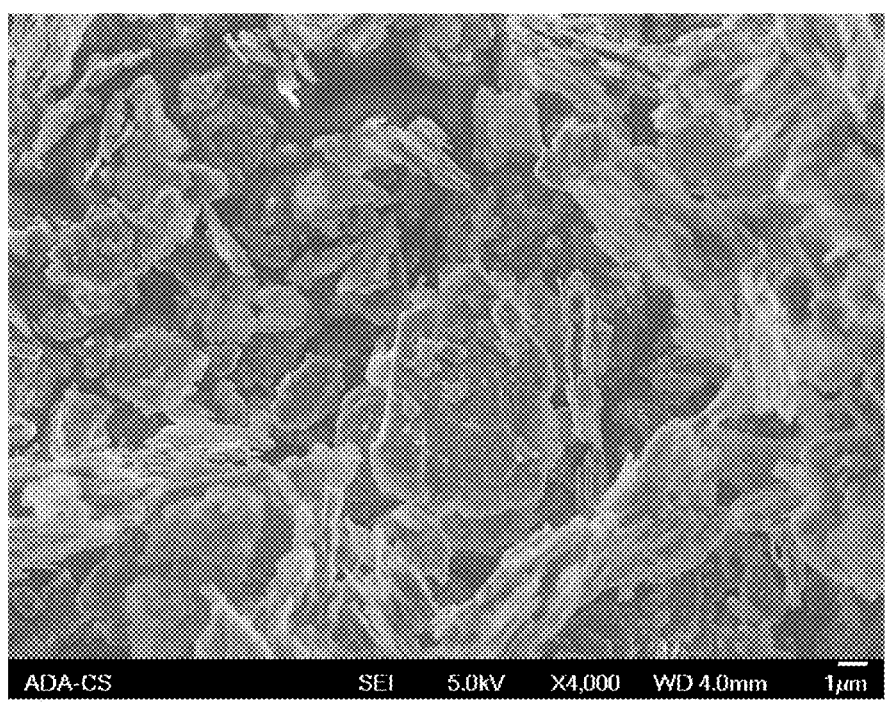
Figure 7A:
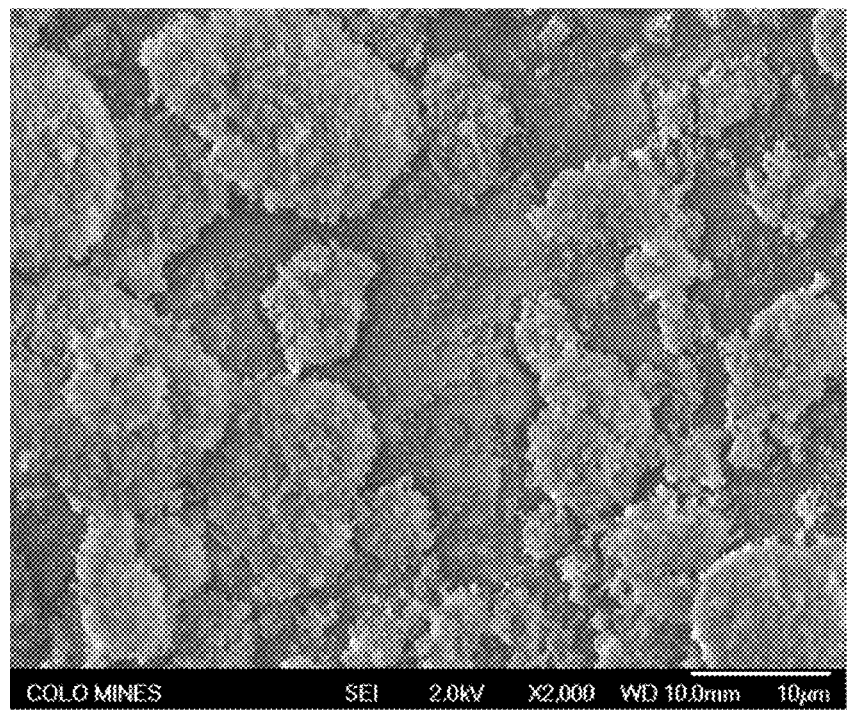
FIGS. 7A and 7B illustrate SEM images of silica.
Figure 7B:
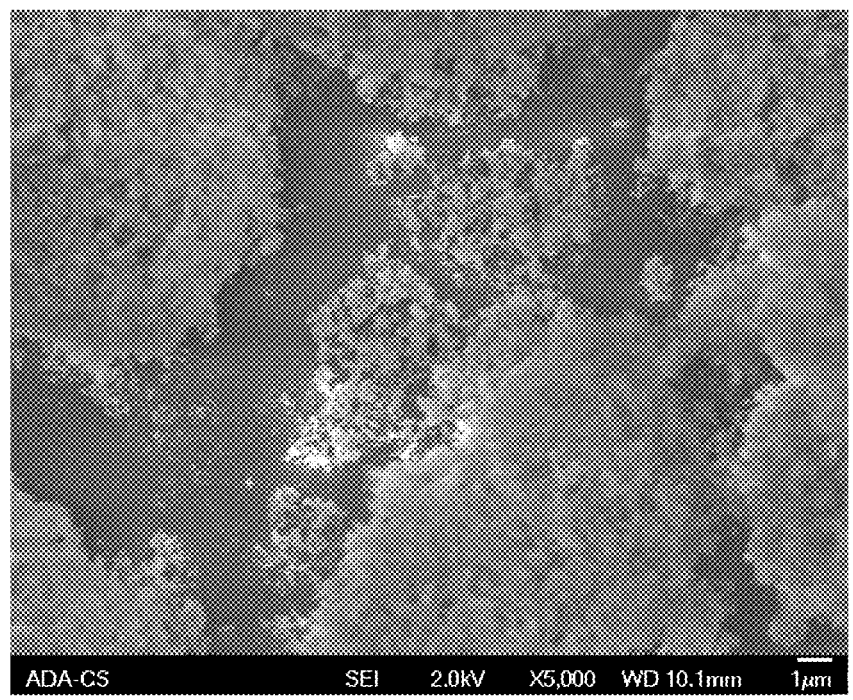

Example 2 illustrates particle shape data for the flake-like solid particulate additives disclosed herein as compared to silica, which includes very small (e.g., sub-micron) particles that have a propensity to agglomerate and thus form circular/spherical agglomerates. A JEOL JSM-7000F field emission scanning electron microscope (FESEM) is used to visualize the particle morphology of the additives disclosed herein, particularly as compared to the particle morphology of materials such as silica. A 5 kV accelerating voltage was used to visualize the graphite, mica, and talc samples. A gold coated sample of hydrophobic silica ($SiO_2$) was visualized with 2 kV accelerating voltage. FIGS. 4-7 illustrate the morphology of flake-like particulate additives in accordance with the present disclosure. Specifically, FIGS. 4A and 4B illustrate the particle morphology of graphite at magnifications of 2000× and 4000×, respectively. FIGS. 5A and 5B illustrate the particle morphology of mica at magnifications of 2000× and 4000×, respectively. FIGS. 6A and 6B illustrate the particle morphology of talc at magnifications of 2000× and 4000×, respectively. In each of these FESEM images, it can be seen that the particles exhibit a flake-like morphology, and tend to be at least several microns in size. In comparison, FIGS. 7A and 7B illustrate the morphology of silica particles (Aerosil® R 974, a hydrophobic fumed silica available from Evonik Corporation, Parsippany, N.J., USA) at magnifications of 2000× and 5000×, respectively. The silica particles are relatively small in size (e.g., much less than 1 μm) and form cloud-like agglomerates.

Figure 8:
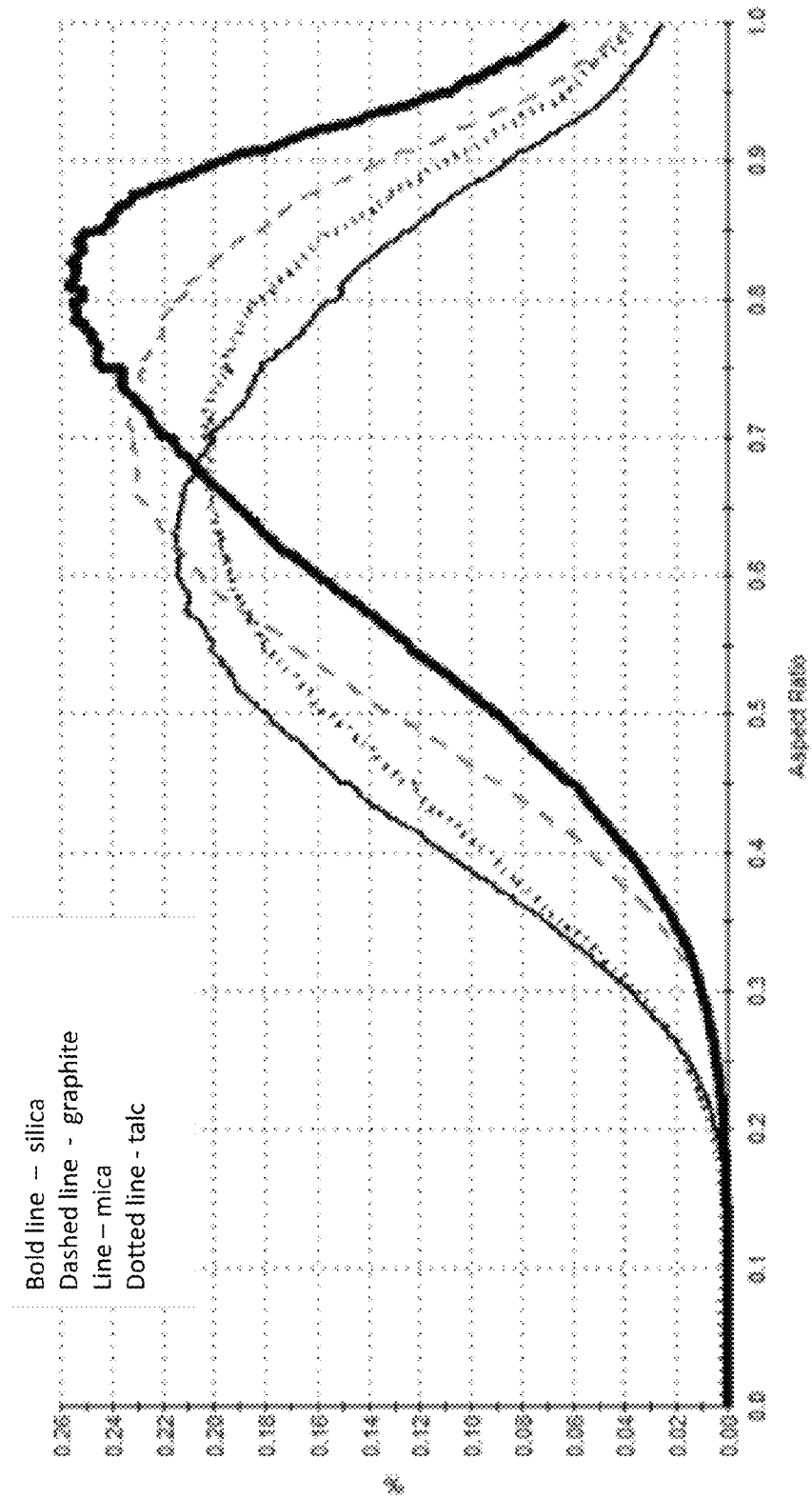
FIG. 8 illustrates an aspect ratio distribution for several different solid particulate additives.
Figure 9:
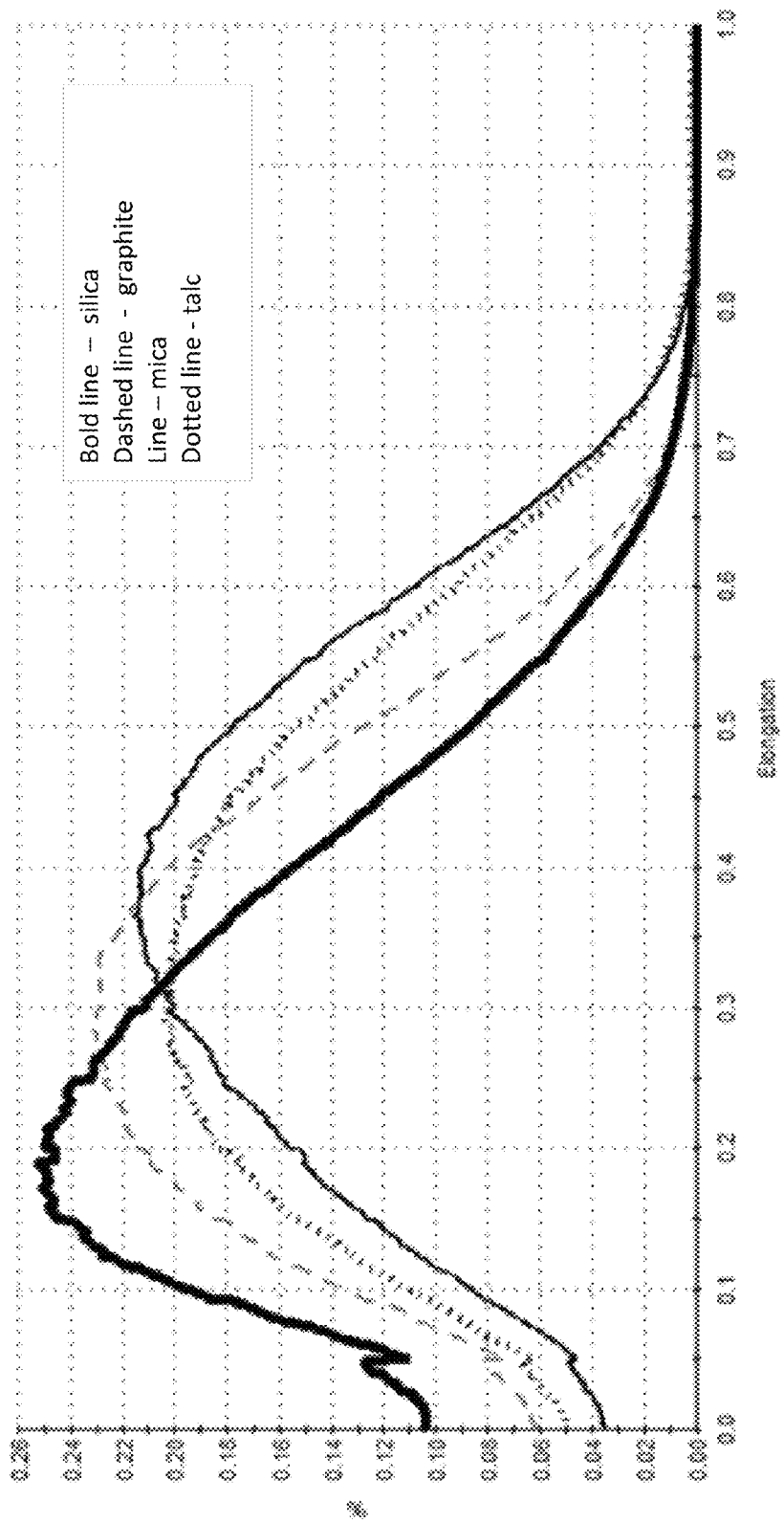
FIG. 9 illustrates an elongation distribution for several different solid particulate additives.
Figure 10:
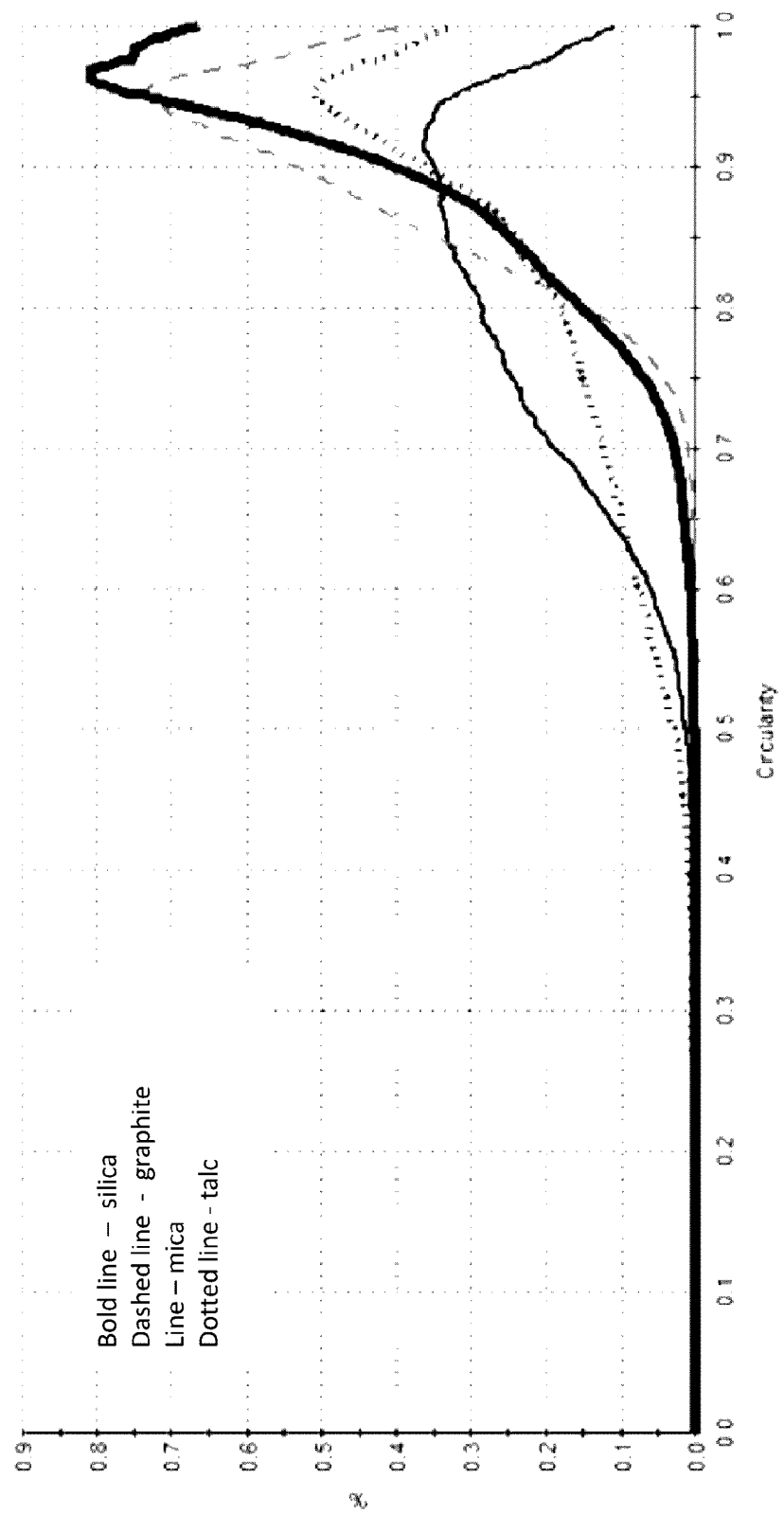
FIG. 10 illustrates a circularity distribution for several different solid particulate additives.

Image analysis is used to determine median aspect ratio, median elongation, and median circularity of the foregoing materials. A Malvern Morphologi®G3 (www.malvern.com, Malvern, Worcestershire, UK) analyzer is used to determine these shape factors according to the Morphologi®G3 instructions. A distribution of aspect ratios of the solid particulate additives and silica is illustrated in FIG. 8. A distribution of elongations of the solid particulate additives and silica is illustrated in FIG. 9. A distribution of circularities of the solid particulate additives and silica is illustrated in FIG. 10.

Table 1, below, presents such shape factor data in terms of median aspect ratio, median elongation, and median circularity.

TABLE 1

Shape Factor Data

| Shape Factor | Graphite | Mica | Talc | Silica |
| --- | --- | --- | --- | --- |
| Median Aspect Ratio | 0.693 | 0.629 | 0.656 | 0.742 |
| Median Elongation | 0.303 | 0.368 | 0.341 | 0.251 |
| Median Circularity | 0.918 | 0.834 | 0.880 | 0.931 |

This data indicate that the solid particulate additives of the sorbent composition disclosed herein have more elongate or rectangular shape than they do a circular shape as compared to a more amorphous particle such as silica. The median aspect ratio of the graphite, mica, and talc are lower than that of the silica being further away from 1, indicating they are of a more rectangular than square in shape. The median elongation numbers also show that the graphite, mica, and talc particles are more elongate than silica. The median circularity of the graphite, mica, and talc particles also are significantly more divergent from a circularity of one, which indicates that these compositions are far from a perfectly circular particle type.

Example 3

Example 3 illustrates improved air flow capabilities of the sorbent compositions of the present disclosure, and presents BFE, SE and AE data of various samples. Table 1 below presents BFE and SE data, measured on an FT4 Rheometer using the SVFR method as described above, and AE data measured on an FT4 Rheometer using the aeration test as described above. It is noted that an AE of 10 mJ would indicate complete fluidization of the sample in the instrument. Table 2 indicates that the use of the solid particulate additives such as graphite, mica, and talc have a significant effect on the BFE, SE and AE of a sorbent composition that includes PAC, even when added in relatively small quantities.

TABLE 2

Basic Flow Energy (BFE), Specific Energy (SE) and Aeration Energy (AE)

| Sample | Characteristic (size, additive) | BFE (mJ) | SE (mJ/g) | AE (mJ) |
|---|---|---|---|---|
| 4 | 30 μm, no additive | 329 | 7.18 | 17.0 |
| 2 | 15 μm, no additive | 357 | 7.88 | 37.5 |
| 3 | 15 μm, 1.0% graphite (bulk mix) | 243 | 6.76 | 26.9 |
| 5 | 15 μm, 0.5% graphite (lab mix) | 261 | 6.76 | 27.1 |
| 6 | 15 μm, 1.0% graphite (lab mix) | 253 | 7.02 | 21.6 |
| 7 | 15 μm, 0.5% mica (lab mix) | 220 | 6.58 | 23.0 |
| 8 | 15 μm, 0.5% talc (lab mix) | 219 | 6.70 | 24.4 |

The example compositions (Samples 3 and 5-8) with smaller median particle size (e.g., 15 μm or less) all show decreased BFE over the comparative sorbent composition with reduced flow properties (Sample 2), and even lower BFE than the comparative composition of 30 μm median particle size (Sample 4). Similarly, the example compositions with smaller median particle size (Samples 3, 5-8) show lower SE than both the comparative Samples 2 and 4. The AE of each of the example compositions (Samples 3, 5-8) was significantly lower than that of the comparative small median particle size with reduced flow properties, approaching the AE of the flowing larger median particle size composition (Sample 4).

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A sorbent composition, comprising a particulate blend of:
    at least about 75 wt. % of a porous carbonaceous sorbent having a median particle size (D50) of at least about 4 μm and not greater than about 15 μm; and
    at least about 0.1 wt. % and not greater than about 5 wt. % of a solid particulate additive, the solid particulate additive having at least one particle property selected from:
        (i) a median aspect ratio of not greater than 0.7;
        (ii) a median circularity of not greater than 0.92; or
        (iii) a median elongation factor of at least 0.3.

2. The sorbent composition recited in claim 1, wherein the porous carbonaceous sorbent comprises powdered activated carbon.

3. The sorbent composition recited in claim 1, wherein the porous carbonaceous material consists essentially of powdered activated carbon.

4. The sorbent composition recited in claim 1, wherein the solid particulate additive has a median aspect ratio of not greater than 0.7.

5. The sorbent composition recited in claim 1, wherein the solid particulate additive has a median circularity of not greater than 0.92.

6. The sorbent composition recited in claim 1, wherein the solid particulate additive has a median elongation factor of at least 0.3.

7. The sorbent composition recited in claim 1, wherein the solid particulate additive has a median aspect ratio of not greater than 0.67.

8. The sorbent composition recited in claim 1, wherein the solid particulate additive has a median circularity of not greater than 0.90.

9. The sorbent composition recited in claim 1, wherein the solid particulate additive has a median elongation factor of at least 0.33.

10. The sorbent composition recited in claim 1, having a Basic Flow Energy of not greater than about 330 mJ, as measured by a powder rheometer using the Stability and Variable Flow Rate test.

11. The sorbent composition recited in claim 1, having a Specific Energy of not greater than 7.5 mJ/g, as measured by a powder rheometer using the Stability and Variable Flow Rate test.

12. The sorbent composition recited in claim 1, having an Aeration Energy of not greater than 30 mJ, during the aeration test, as measured by a powder rheometer.

13. The sorbent composition recited in claim 1, where the porous carbonaceous sorbent has a median particle size of not greater than about 12 μm.

14. The sorbent composition recited in claim 1, where the powdered activated carbon sorbent has a median particle size of at least about 8 μm and not greater than about 12 μm.

15. The sorbent composition recited in claim 1, where the median particle size of the solid particulate additive is at least about 1 μm.

16. The sorbent composition recited in claim 1, where the solid particulate additive is selected from the group consisting of phyllosilicate minerals, graphite, and mixtures thereof.

17. The sorbent composition recited claim 1, where the solid particulate additive is selected from the group consisting of mica, talc, graphite, and mixtures thereof.

18. The sorbent composition recited in claim 1, where the solid particulate additive comprises graphite.

19. The sorbent composition recited in claim 1, where the sorbent composition comprises not greater than about 3 wt % of the solid particulate additive.

20. The sorbent composition recited in claim 1, where the addition of the solid particulate additive reduces fluctuation in line pressure as measured by standard deviation of less than ±0.050 psi.

21. The sorbent composition recited in claim 1, where the addition of the solid particulate additive reduces fluctuation in line pressure as measured by the difference between maximum to minimum line pressure is less than 0.1 psi.

22. The sorbent composition recited in claim 1, where the solid particulate additive has a median particle size that is greater than or equal to the median particle size of the porous carbonaceous sorbent.

23. The sorbent composition recited in claim 1, where the solid particulate additive has a median particle size that is less than the median particle size of the porous carbonaceous sorbent.

24. The sorbent composition recited in claim 1, where the sorbent composition comprises not greater than about 2 wt. % of the solid particulate additive.

* * * * *